United States Patent
Liang et al.

(10) Patent No.: US 9,182,633 B2
(45) Date of Patent: Nov. 10, 2015

(54) DISPLAY DEVICE AND DISPLAY APPARATUS HAVING PARTICULAR BARRIER WALL STRUCTURE

(71) Applicant: INNOLUX CORPORATION, Miao-Li County (TW)

(72) Inventors: Chih-Ming Liang, Miaoli County (TW); Kuo-Liang Chuang, Hsinchu (TW); Li-Ming Lin, Taipei (TW); Shu-Lan Chen, Miaoli County (TW)

(73) Assignee: INNOLUX CORPORATION, Miao-Li County (TW)

( * ) Notice: Subject to any disclaimer, the term of this patent is extended or adjusted under 35 U.S.C. 154(b) by 107 days.

(21) Appl. No.: 14/064,169

(22) Filed: Oct. 27, 2013

(65) Prior Publication Data
US 2014/0118676 A1 May 1, 2014

(30) Foreign Application Priority Data
Oct. 31, 2012 (TW) .............................. 101140287 A (51) Int. Cl.
*G02F 1/1339* (2006.01)

(52) U.S. Cl.
CPC ........ *G02F 1/1339* (2013.01); *G02F 2201/501* (2013.01); *G02F 2202/28* (2013.01)

(58) Field of Classification Search
CPC ... G02F 1/1339; G02F 1/1341; G02F 1/1345; G02F 1/133351; G02F 1/13394; G02F 1/13392; G02F 1/133512; G02F 2001/13415

USPC .......................................... 349/153, 155, 190
See application file for complete search history.

(56) References Cited

U.S. PATENT DOCUMENTS

| | | | | |
|---|---|---|---|---|
| 2002/0024096 | A1* | 2/2002 | Yamazaki et al. | ............ 257/359 |
| 2013/0048995 | A1* | 2/2013 | Yamazaki et al. | .............. 257/59 |

FOREIGN PATENT DOCUMENTS

| | | |
|---|---|---|
| TW | 201044080 A1 | 12/2010 |
| TW | 201228044 A1 | 7/2012 |

OTHER PUBLICATIONS

Taiwan Patent Office, Office action issued on Sep. 26, 2014.

* cited by examiner

*Primary Examiner* — Mike Qi
(74) *Attorney, Agent, or Firm* — Li & Cai Intellectual Property (USA) Office (57) ABSTRACT

A display device includes a first substrate, a second substrate, a space layer, and a protective film. The first substrate has a first surface, and the second substrate comprises a visible region and a non-visible region. The second substrate has a second surface, and the second surface is opposite to the first surface. The space layer includes a plurality of spacers and at least one space component. The spacers are located on the visible region, and the space component is located in the non-visible region. The protective film has water vapor barrier property. The protective film covers the space component, and forms at least one barrier wall. The barrier wall touches the first surface and the second surface.

18 Claims, 5 Drawing Sheets

DISPLAY DEVICE AND DISPLAY APPARATUS HAVING PARTICULAR BARRIER WALL STRUCTURE

BACKGROUND

1. Technical Field

The present disclosure relates to a display device; in particular, a display device which includes sealant.

2. Description of Related Art

Currently, the common image display device, for example liquid crystal display device or organic light emitting display device, usually includes an image display panel. The image display panel usually includes two substrates and a sealant. The above-mentioned substrates may be color filter substrate and active component (TFT) array substrate, and the image display panel is usually formed by using the sealant to adhere the color filter substrate and the active component array substrate.

The sealant can also prevent the liquid crystal from leaking out and keep water vapor and oxygen from entering the image display device. Hence, the sealant can prevent dampening of the organic light emitting diodes so that the lifetime of the organic light emitting diodes can be increased. However, in general, the sealant ages and becomes brittle over time so that water vapor and oxygen may leak through the sealant and enter the (inner portion of the) image display device thereby affecting the image display device.

SUMMARY

An embodiment of the present disclosure provides a display device. The display device includes a first substrate, a second substrate, a space layer, and a protective film. The first substrate has a first surface, and the second substrate has a visible region and a non-visible region surrounding the visible region. The second substrate includes an active component (TFT) array disposed on the visible region. The second substrate has a second surface, and the second surface is opposite to the first surface. The space layer includes a plurality of spacers and at least one space component. The spacers are located on the visible region, and the space component is located in the non-visible region. The protective film has water vapor barrier property. The protective film covers the space component, and forms at least one barrier wall. The barrier wall touches the first surface and the second surface.

An embodiment of the present disclosure illustrates a display apparatus. The display apparatus includes a display device, a printed circuit board assembly, and an assembly case. The printed circuit board assembly and the display device are electrically connected and disposed in the assembly case. The above-mentioned display device includes a first substrate, a second substrate, a space layer, and a protective film. The first substrate has a first surface, and the second substrate has a visible region and a non-visible region surrounding the visible region. The second substrate includes an active component array disposed on the visible region. The second substrate has a second surface, and the second surface is opposite to the first surface. The space layer includes a plurality of spacers and at least one space component. The spacers are located on the visible region, and the space component is located in the non-visible region. The protective film has water vapor barrier property. The protective film covers the space component, and forms at least one barrier wall. The barrier wall touches the first surface and the second surface.

To sum up, the present disclosure includes the space component and the protective film disposed on the space component to form the barrier wall. The present disclosure can decrease the probability of water vapor and oxygen entering the inner display device even after the sealant ages or becomes brittle. Besides, the present disclosure provides various designs of barrier walls to prevent water vapor and oxygen from entering the inner display device more effectively.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to facilitate further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or similar parts.

Figure 1A:
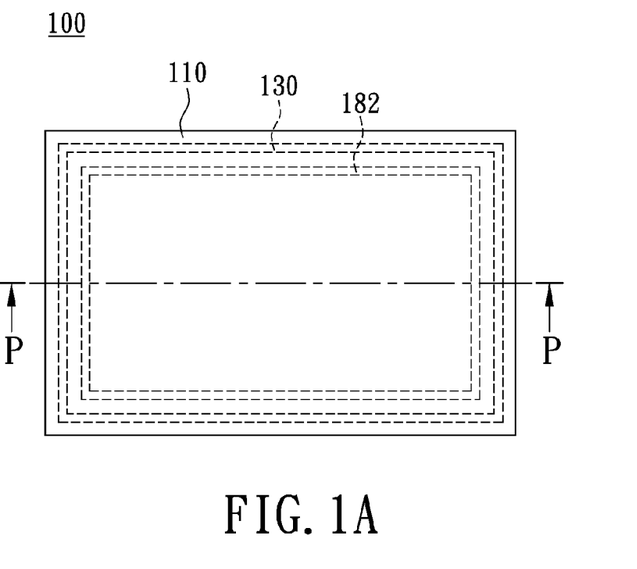
FIG. 1A depicts a top view of a display device in accordance with the first embodiment of the present disclosure.
Figure 1B:
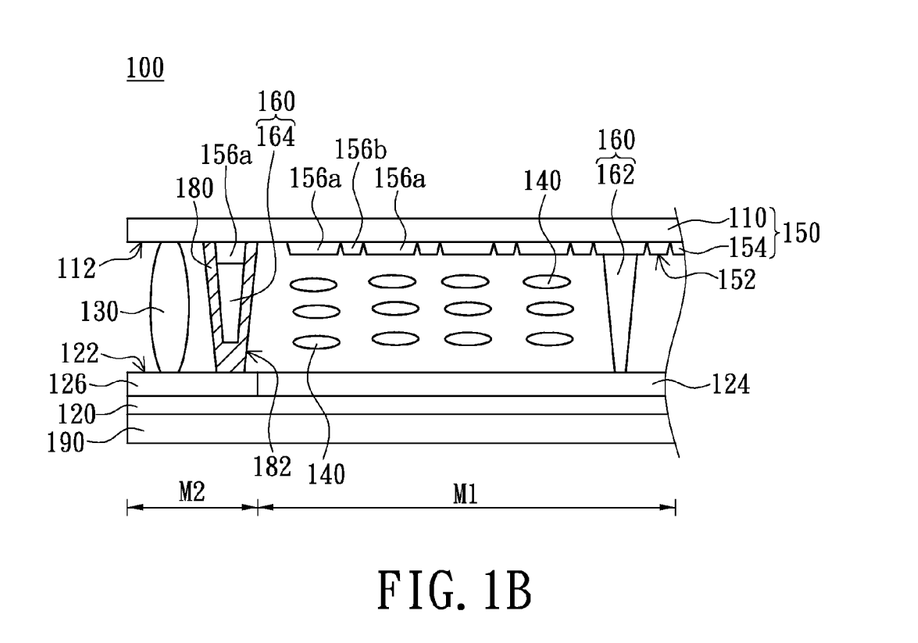
FIG. 1B depicts a cross-sectional view along a line P-P of a display device shown in FIG. 1A in accordance with the first embodiment of the present disclosure.

FIG. 1A illustrates a top view of a display device in accordance with the first embodiment of the present disclosure. FIG. 1B illustrates a cross-sectional view along a line P-P of a display device shown in FIG. 1A in accordance with the first embodiment of the present disclosure. Please refer to FIGS. 1A and 1B. The display device 100 includes a first substrate 110, a second substrate 120, a liquid crystal layer 140 and a backlight module 190. The first substrate 110 is combined with the second substrate 120. The liquid crystal layer 140 is disposed between the first substrate 110 and the second substrate 120. The first substrate 110 and the second substrate 120 are disposed above the backlight module 190.

The first substrate 110 has a first surface 112, and the second substrate 120 includes a visible region (active area) M1 and a non-visible (peripheral area) region M2 surrounding the visible region M1. The second substrate 120 includes an active component (TFT) array 124 disposed at the visible region M1. The second substrate 120 has a second surface 122. Moreover, the second substrate 120 further includes at least one metal trace 126. The metal trace 126 is disposed at the non-visible region M2 and may include a shorting bar and/or a gate-in-panel element (GIP element).

A color filter layer 154 can be disposed on the first surface 112 of the first substrate 110 to form a color filter substrate 150. In the present embodiment, the color filter layer 154 may include a black matrix layer 156b and a plurality of color filter 156a with various colors, and the colors of the color filters 156a are not completely the same. The color filter 154 of the color filter substrate 150 has a third surface 152, and the third surface 152 is opposite to the second surface 122. Moreover, the configuration of the color filters 156a corresponds to the active component array 124.

However, in other embodiments, the color filter layer 154 can be disposed on the second substrate 120. Namely, the second substrate 120 includes the active component array 124 and the color filter layer 154, i.e. a COA (color filter on array) structure. In addition, the color filter layer 154 can include only the color filters 156a with various colors, and the black matrix layer 156b can also be disposed on the second substrate 120. The present disclosure is not limited to the colors of the color filters 156a and the types of the color filter layer 154.

In practice, the black matrix layer 156b can be disposed on the first surface 112. A portion of the first surface 112 may be exposed through the black matrix layer 156b to be partitioned into a plurality of monochromatic pixel regions (not shown). The color filters 156a of various colors are disposed in these mono color pixel regions. The black matrix layer 156b is used to shield light. Hence, the black matrix layer 156b can reduce the effect of light leakage on image performance. The material of the black matrix layer 156b may be black resin, black photoresists, and so on. The present disclosure does not limit the material of the black matrix layer 156b.

The color filters 156a are arranged in the monochromatic pixel regions. The configuration of the color filters 156a may be mosaic type, delta type, and stripe type. The color filters 156a are photoresists of various colors, and the material of the color filters 156a may be photoresist material. The present disclosure does not limit the material and coordination of the color filters 156a.

Besides, according to need, the display device 100 of different products, such as field sequential color LCD, may not require any color filters 156a. Hence, the color filter layer 154 shown in FIG. 1B is only used as a descriptive example and does not limit the present disclosure.

The first substrate 110 is combined with the second substrate 120 through the adhesive layer 130. Specifically, the adhesive layer 130 is disposed at the non-visible region M2 of the second surface 122 and surrounds the visible region M1. The adhesive layer 130 is used to adhere the first substrate 110 and the second substrate 120. The adhesive layer 130 may be photocurable resins, or thermosetting resin.

The liquid crystal layer 140 is disposed between the first substrate 110 and the second substrate 120. Explicitly, the liquid crystal layer 140 is disposed in a space between the first substrate 110, the second substrate 120 and the adhesive layer 130. The categories of liquid crystal may be Nematic Liquid Crystal, Smectic Liquid Crystal, Discotic Liquid Crystal, or Cholesteric Liquid Crystal. It is worth mentioning that the display device 100 can further include conductor films (not shown) and alignment films (not shown). The alignment films are disposed beside the liquid crystal to align the direction of the liquid crystal. The conductor films are disposed on the third surface 152 and the second surface 122, i.e. between the alignment films and the substrate. The conductor films are used to control the rotation direction of the liquid crystal by conducting electricity to the liquid crystal. Generally speaking, the alignment films are commonly polymer materials such as polyimide. The conductor film is commonly an indium tin oxide film. The present disclosure does not limit the materials of the conductor films and the alignment films.

The display device 100 includes a space layer 160. The space layer 160 is used to maintain a cell gap between the first substrate 110 and the second substrate 120. The space layer 160 includes a plurality of spacers 162 and at least one space component 164, wherein the spacers 162 are located in the visible region M1, and the space component 164 is located in the non-visible region M2. It is worth mentioning that the spacers 162 may be designed in different shapes, for example, sphere, polygonal pillar, cone, pyramid, partition plate type, and so on. The space layer 160 may be a photoresist of any color or a transparent photoresist, made of polymer material or silicon oxide material and formed by photolithigraphy, sputtering process, chemical vapor deposition, or spray. Besides, the space layer 160 may be disposed on the third surface 152 and the second surface 122. However, the present disclosure does not limit the design and process requirement of the space layer 160.

In the present embodiment, the space layer 160 forms a multi-layer structure on the third surface 152. The multi-layer structure can be formed by stacking photoresist materials. The spacers 162 are cone shaped and located in the visible region M1. The space component 164 is a wall shape surrounding the spacers 162 and located in the non-visible region M2.

The display device 100 includes a protective film 180 having water vapor and oxygen barrier property. The protective film 180 covers the space component 164 to form a barrier wall 182 and the protective film 180 is in contact with the space component 164. It is worth mentioning that the protective film 180 may be an inorganic material film having water vapor and oxygen barrier property, for example $SiN_x$, $SiO_x$, $SiO_xN_y$, or $Al_2O_3$, etc. Additionally, in order to prevent water vapor and oxygen from entering the inner display device 100 better, the protective film 180 can be formed at the visible region M1. Hence, in order to prevent the image performance from being affected, the protective film 180 can be a highly transparent film. Generally speaking, the protective film 180 can be formed by vacuum evaporation deposition, vacuum sputtering, or chemical vapor deposition. However, the present disclosure does not limit the method of the protective film 180.

The barrier wall 182 is contacted with the first surface 112, and the second surface 122, and is used to obstruct water vapor and oxygen from entering the inner display device. Specifically, in the instant embodiment, the barrier wall 182 is located in the non-visible region and is forms a frame-shaped wall. The above-mentioned frame-shaped wall, namely the barrier wall 182, surrounds the visible region M1. The adhesive layer 130 also forms another frame-shape wall, and surrounds the barrier wall 182.

In the instant embodiment, the backlight module 190 is used to provide a sufficient and uniform light source. For example, the backlight module 190 may be a side type backlight module, or a direct type backlight module. The present disclosure is not limited the type of backlight module 190.

Besides, in the instant embodiment, the amount of the barrier wall 182 is one. However, in other embodiments, in order to more effectively prevent water vapor and oxygen from entering the inner display device 100, the amount of the barrier wall 182 may be more than one. The present disclosure does not limit the amount of the barrier wall 182.

Figure 2A:
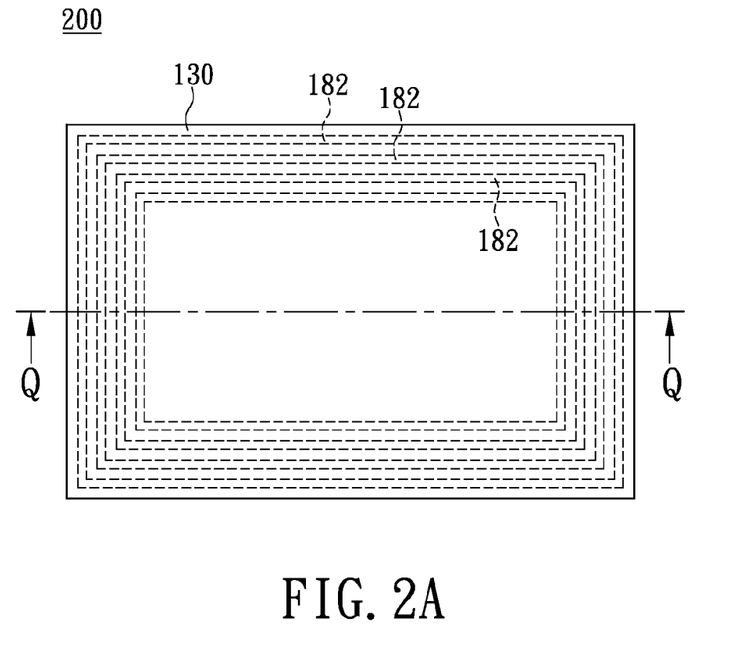
FIG. 2A depicts a top view of a display device in accordance with the second embodiment of the present disclosure.
Figure 2B:
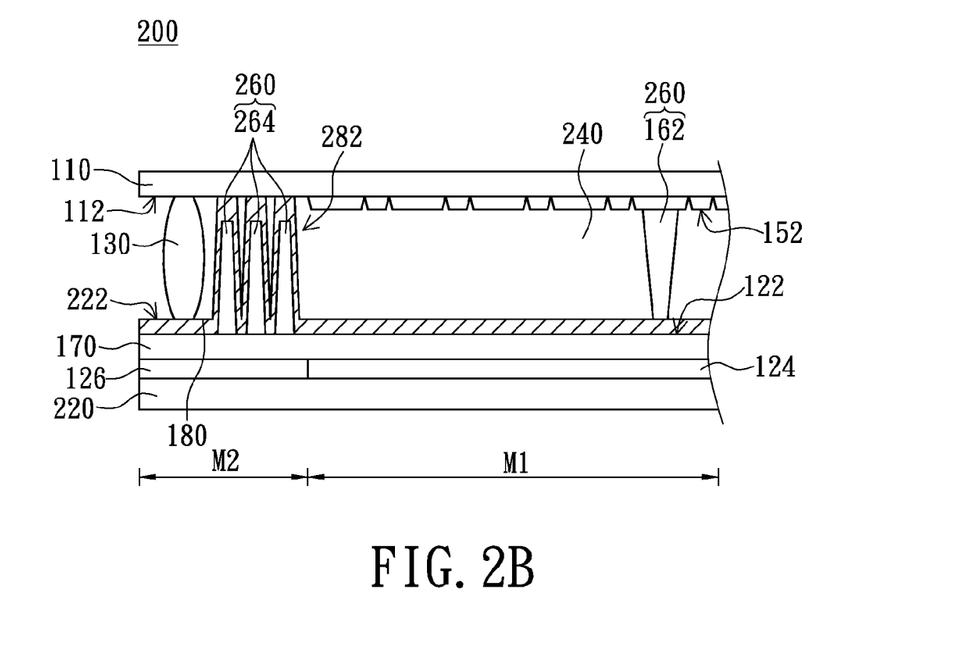
FIG. 2B depicts a cross-sectional view along a line Q-Q of a display device shown in FIG. 2A in accordance with the second embodiment of the present disclosure.

FIG. 2A illustrates a top view diagram of a display device in accordance with the second embodiment of the present disclosure. FIG. 2B illustrates a cross-sectional view of a display device shown in FIG. 2A along a line Q-Q in accordance with the second embodiment of the present disclosure. Please refer to FIGS. 2A and 2B. The structure of the display device 200 in accordance with the second embodiment is similar to the display device 100 in accordance with the first embodiment. For example, the display device 100 and the display device 200 include the liquid crystal layer 140. However, there are some differences between the display device 100 and the display device 200. The following detailed description explains the difference between the display device 100 and the display device 200, and the common features are not described again.

The display device 200 includes a first substrate 110, a second substrate 220, the filling layer 240, and a space layer 260. The first substrate 110 is combined with the second substrate 220. The filling layer 240 is disposed between the first substrate 110 and the second substrate 220. In the second embodiment, the display device 200 is an Organic Light Emitting Display (OLED). Hence, the differences between the second substrates 220 and 120 is that the second substrate 220 further includes an organic light emitting diode array 170 used as a light source of the display device 200 and a display medium.

Specifically, the second substrate 220 includes the active component array 124 and the organic light emitting diode array 170. The organic light emitting diode array 170 is electrically connected to the active component array 124. Hence, the second substrate 220 has the second surface 122, and the second surface 122 is opposite to the third surface 152. The organic light emitting diode array 170 has a plurality of organic light emitting diodes (not shown), and every organic light emitting diode includes a first electrode (not shown), an organic light emitting layer (not shown), and a second electrode (not shown). The organic light emitting diode array 170 is electrically connected to the active component array 124 through the first electrode.

It is worth noting, the organic light emitting diode array 170 may be formed by the configuration of the organic light emitting diodes of various colors, or the configuration of the organic light emitting diodes with white color. The organic light emitting diode is self-emissive, so the display device 200 does not need a backlight module.

In the second embodiment, the space layer 260 includes the spacers 162 and three space component 264. Specifically, the spacers 162 located on the visible region M1 are formed on the third surface 152, and the space components 264 located in the non-visible region M2 are formed on the second surface 122. It is worth mentioning that the spacers 162 and the space components 264 can be formed on the same surface in the same processing step according to different processing requirement, for example on the third surface 152 or the second surface 122 in the same processing step. However, the spacers 162 and the components 264 can be formed on different surfaces in the different processing step.

The protective film 180 covers the space components 264, namely the protective film 180 is in contact with the space components 264. In order to more effectively prevent water vapor and oxygen from entering the inner display device 200, the protective film 180 also covers the second surface 122 to form three barrier walls 282. Similarly, the barrier walls 282 are also in contact with the first surface 112 and the second surface 122, and the barrier walls 282 covers the second surface 122 to form the fourth surface 222. The barrier walls 282 are used to prevent water vapor and oxygen from entering the inner display device 200.

Specifically, in the present embodiment, the three barrier walls 282 are located in the non-visible region M2 and surround the visible region M1. The adhesive layer 130 forms a frame-shaped wall and surrounds the three barrier walls 282. It is worth noting that the protective film 180 also covers the second surface 122 and extends into the visible region M1. In order to prevent the image performance from being affected, the protective film 180 can be a highly transparent film.

When the amount of the barrier walls 282 is one (for example the barrier wall 182 shown in FIG. 1B), in order to prevent water vapor and oxygen from entering the inner display device, the thickness of the protective film 180 reaches at least a preset value. However, when the amount of the barrier walls 282 is more than one (for example the barrier wall 282), the protective film 180 can prevent water vapor and oxygen from entering the inner display device even if the thickness of the protective film 180 is smaller. Hence, the forming time of the protective film 180 can be decreased to facilitate manufacturing of the display device. Namely, a decreased forming time of the protective film 180 is sufficient to reach the preset thickness.

However, it must be mentioned that although the amount of the barrier walls 282 is three in the second embodiment, the amount of the barrier walls 282 may be two or more than three in other embodiments. Hence, the amount of the barrier walls 282 is provided for illustration, without any intention to be used for limiting the present disclosure.

Figure 3:
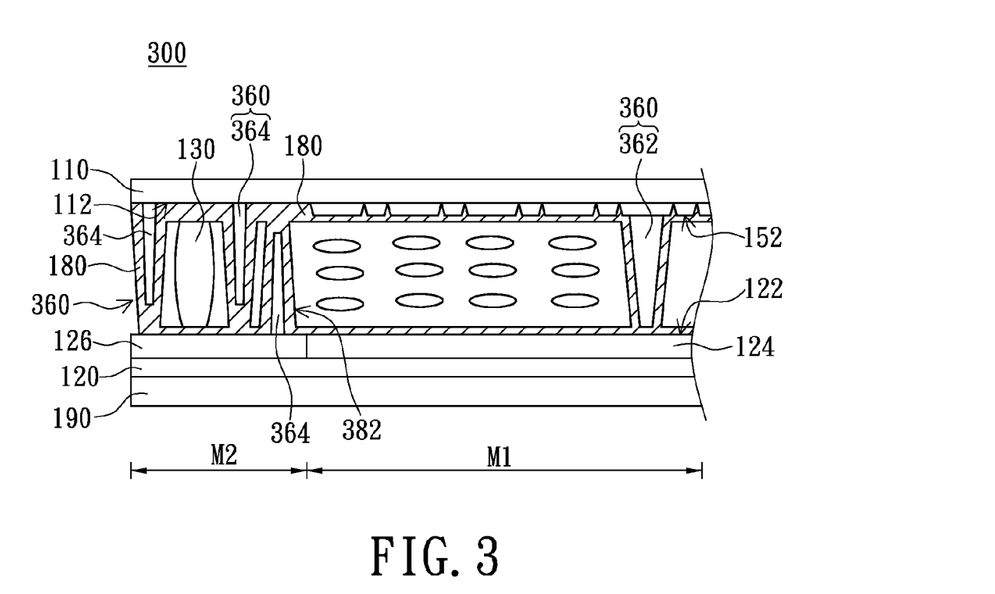
FIG. 3 depicts a cross-sectional view of a display device in accordance with the third embodiment of the present disclosure.

FIG. 3 illustrates a cross-sectional diagram of a display device in accordance with the third embodiment of the present disclosure. Please refer to FIG. 3. The structure of the display device 300 in accordance with the third embodiment is similar to the structure of the display device 100 in accordance with the first embodiment. For example, the display device 100 and the display device 300 include the backlight module 190. However, there are some differences between the display device 100 and the display device 300. The differences between the display device 100 and the display device 300 are mainly that the barrier walls 382 are different from the barrier wall 182.

Given that the display device 300 in accordance with third embodiment is similar to the display device 100 in accordance with first exemplary embodiment, the following detailed description explains with schemas the difference between the display device 100 and the display device 300, and the common features are not described again.

Please refer to FIG. 3. In the present embodiment, the space layer 360 includes the spacers 362 and three space components 364. Specifically, the spacers 362 located on the visible region M1 are formed on the third surface 152, and the space components 364 located in the non-visible region M2 are formed on the first surface 112 and the second surface 122 respectively. It is worth mentioning that the spacers 362 and the space components 364 can be formed on different surfaces in different processing steps.

The protective film 180 covers the space components 364 to form three barrier walls 382, and covers the spacers 362 to form columns. In order to distinctly prevent water vapor and oxygen from entering the inner display device 300, the protective film 180 also covers the third surface 152 and the second surface 122. It must be mentioned that every barrier wall 382 and column is also in contact with the first surface 112 and the second surface 122 and used to prevent water vapor and oxygen from entering the display device 300.

As mentioned above, in the third embodiment, the barrier walls 382 surround the visible region M1. It is worth noting that the protective film 180 covers the third surface 152 and the second surface 122 and extends into the visible region M1. In order to prevent the image performance from being affected, the protective film 180 can be a highly transparent film.

Besides, in the third embodiment, one of the space components 364 is located besides the adhesive layer 130, and the other space components 364 are located between the spacers 362 and the adhesive layer 130. Similarly, the adhesive layer 130 also forms a frame-shaped wall. However, it is worth mentioning that two space components 364 may be located besides the adhesive layer 130 and the amount of the space components 364 may be more than three in other embodiments. Hence, the location of the adhesive layer 130 and the amount of the space components 364 are provided for illustration, without any intention to be used for limiting the present disclosure.

Figure 4:
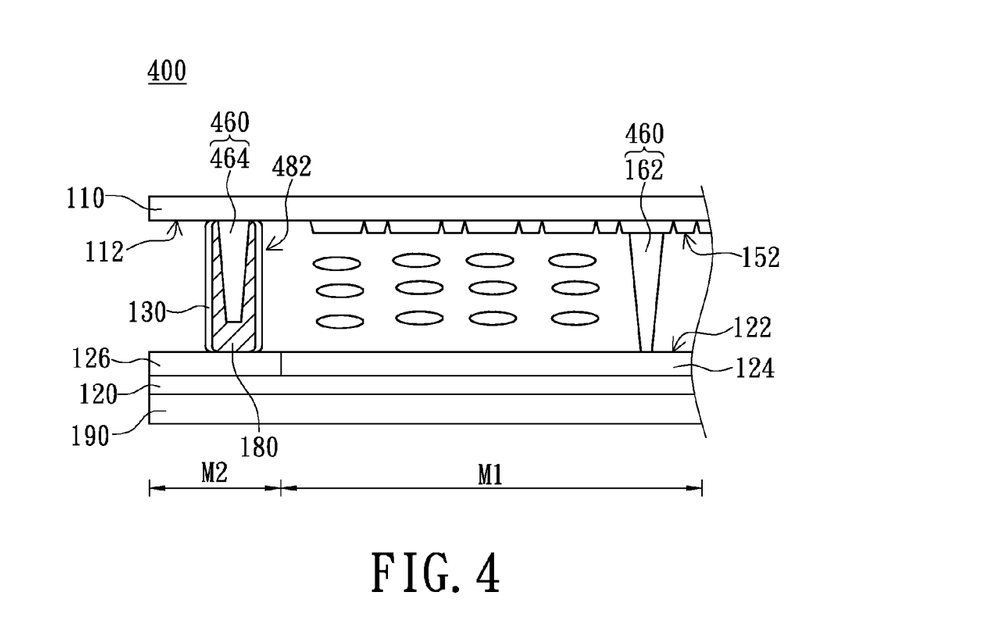
FIG. 4 depicts a cross-sectional view of a display device in accordance with the fourth embodiment of the present disclosure.

FIG. 4 illustrates a cross-sectional diagram of a display device in accordance with the fourth embodiment of the present disclosure. Please refer to FIG. 4. The structure of the display device 400 in accordance with fourth embodiment is similar to the structure of the display device 300 in accordance with third embodiment. For example, the display device 300 and the display device 400 include the backlight module 190. However, there are some differences between the display device 300 and the display device 400. The differences between the display device 300 and the display device 400 are mainly that the barrier walls 482 in accordance with fourth embodiment are different from the barrier wall 382 in accordance with third embodiment.

Given that the display device 400 in accordance with fourth embodiment is similar to the display device 300 in accordance with third embodiment, the following detailed description explains with schemas the difference between the display devices 300 and the display device 400, and the common features are not described again.

Please refer to FIG. 4. In the fourth exemplary embodiment, the space layer 460 includes the spacers 162 and one space component 464. Specifically, the spacers 162 located on the visible region M1 are formed on the third surface 152, and the space component 464 located in the non-visible region M2 is formed on the first surface 112. It is worth noting that the protective film 180 covers the space component 464 to form a barrier wall 482. The barrier wall 482 is used to prevent water vapor and oxygen from entering the inner display device 400. The barrier wall 482 also forms a frame-shaped wall surrounding the visible region M1. The adhesive layer 130 covers the barrier wall 482 and is in contact with the external surface of the barrier wall 482. Hence, the adhesive layer 130 is used to adhere the first substrate 110 and the second substrate 120.

However, in other embodiment, the location of the adhesive layer 130 and the amount of the space component 464 in FIG. 4 are provided for illustration, without any intention to be used for limiting the present disclosure.

Figure 5A:
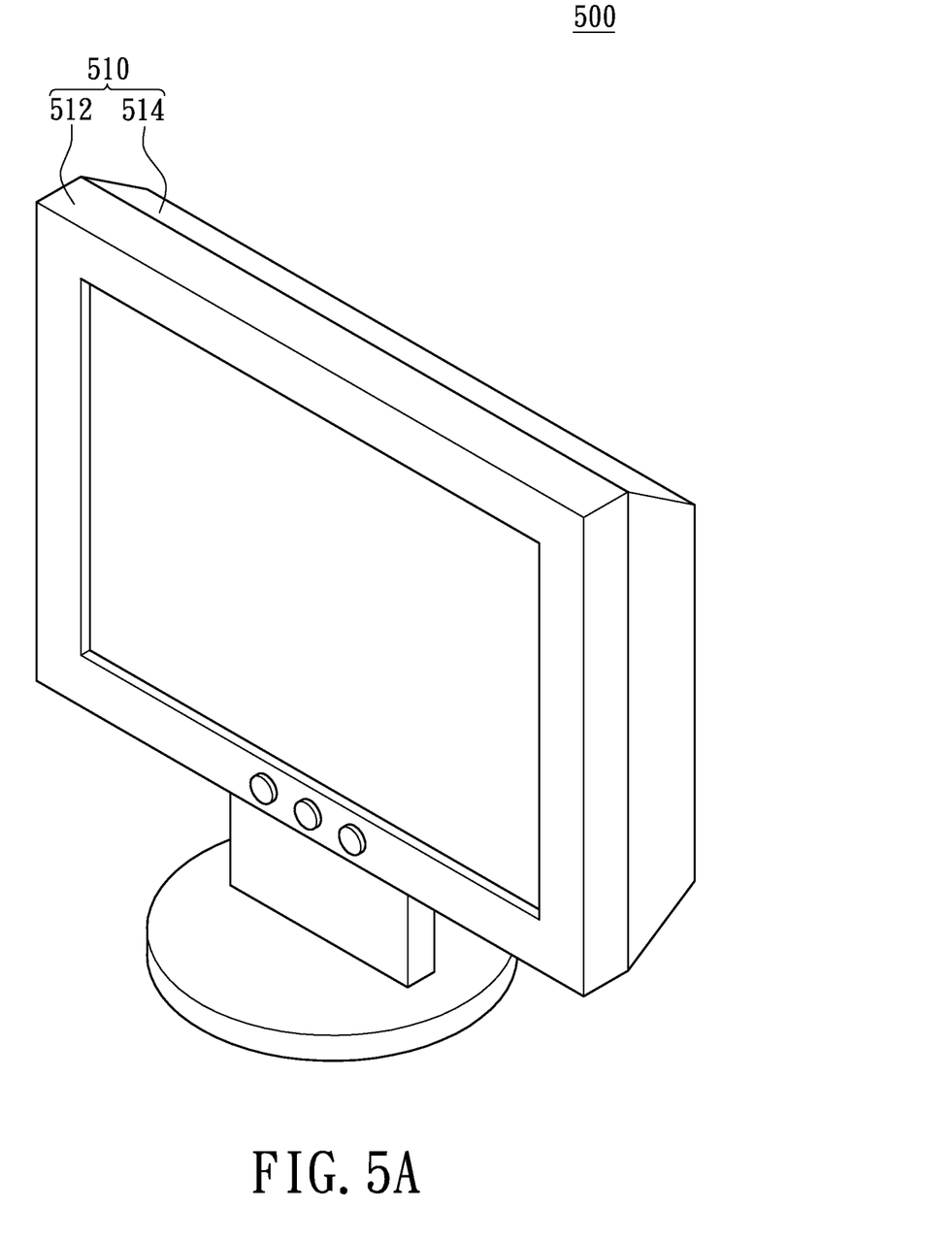
FIG. 5A depicts a perspective view of a display apparatus in accordance with an embodiment of the present disclosure.
Figure 5B:
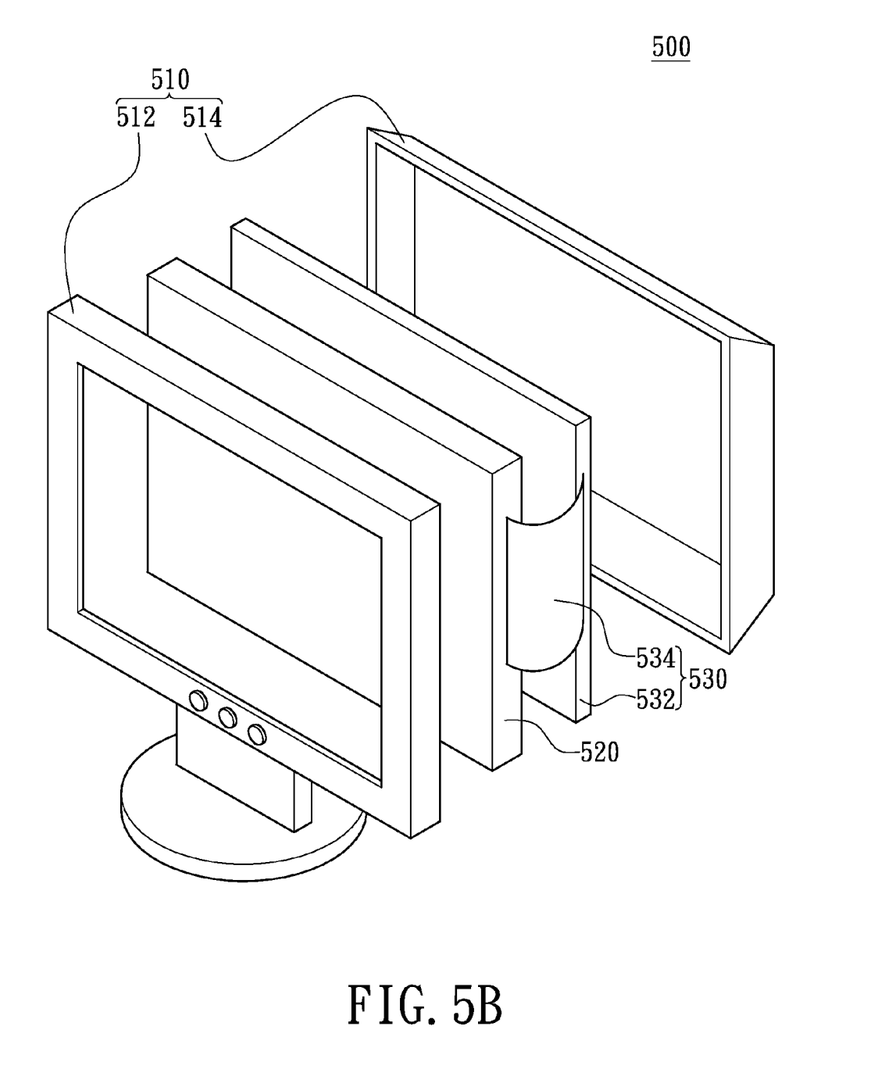
FIG. 5B depicts an exploded view of a display apparatus shown in FIG. 5A in accordance with an embodiment of the present disclosure.

FIG. 5A illustrates a perspective diagram of a display apparatus in accordance with an embodiment of the present disclosure. FIG. 5B illustrates an exploded diagram of a display apparatus shown in FIG. 5A in accordance with an embodiment of the present disclosure. Please refer to FIGS. 5A and 5B. The display apparatus 500 includes an assembly case 510, a display device 520, and a printed circuit board assembly 530. The display device 520 and the printed circuit board assembly 530 are disposed in the assembly case 510.

The assembly case 510 can include two case components 512, 514. The case components 512, 514 can combine with each other through engagement or screw locking manner. The display device 520 is disposed between the case components 512, 514. The display device 520 and the printed circuit board assembly 530 are disposed in the assembly case 510 by combining the case components 512, 514. However, in other embodiments, the assembly case 510 may include three or more than three case components, and the printed circuit board assembly 530 can be disposed in the assembly case 510 by other appropriate manners. The present disclosure is not limited to this.

It is worth mentioning that the display device 520 can be the above-mentioned display device 100, 200, 300, or 400. Hence, the display device 520 can be a liquid crystal display device or an organic light emitting display device. The present disclosure is not limited to the variety of the display device 520.

The display device 520 is electrically connected to the printed circuit board assembly 530. The printed circuit board assembly 530 includes a power supply, driving elements, passive components, active components, etc. Specifically, the printed circuit board assembly 530 includes a rigid circuit board 532 and a flexible circuit board 534.

The flexible circuit board 534 is connected between the rigid circuit board 532 and the display device 520. Hence, the printed circuit board assembly 530 can be electrically connected to the display device 520 through the flexible circuit board 534. Besides, in the present embodiment, the printed circuit board assembly 530 can be electrically connected to the display device 520 through a plurality of wires. However, the present disclosure does not limit the type of the printed circuit board assembly 530 and the method of electrical connection.

The display device 520 can be a liquid crystal display device or an organic light emitting display device, so the display device 520 can be applied in a variety of display device products. Namely, the display apparatus 500 may be the liquid crystal display of desktop (shown in FIGS. 5A and 5B), a notebook, a liquid crystal TV or a portable electronic device. The above-mentioned portable electronic device may be mobile phones, digital cameras, handheld game consoles, or personal digital assistants In summary, the present disclosure includes the space component and the protective film disposed on the space component to form a barrier wall. The present disclosure can decrease the probability of water vapor and oxygen from entering the inner display device even when the sealant ages and becomes brittle. Besides, the present disclosure provides various designs of barrier walls to more effectively prevent water vapor and oxygen from entering the inner display device.

Additionally, in the present disclosure, the display device 520 can be applied in a variety of display device products. As mentioned previously, the display device can be a liquid crystal display device or an organic light emitting display device. However, in other embodiments, the display apparatus can be designed according to processing requirement, so the display device can be of another variety.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A display device comprising:
   a first substrate having a first surface;
   a second substrate comprising a visible region and a non-visible region, and having a second surface opposite to the first surface;
   a space layer including a plurality of spacers and at least one space component, wherein the spacers are located on the visible region, and the space component is located in the non-visible region; and
   a protective film having water vapor barrier property, covering the space component in which the spacer located inside of the space component, and the protective film covering the whole spacer, and contacting with the first surface and the second surface;
   wherein the space component and the protective film form a barrier wall.

2. The display device according to claim 1, wherein the protective film is an inorganic material film.

3. The display device according to claim 1, wherein the space component is disposed on the first surface, and the protective film covers the space component and the first surface.

4. The display device according to claim 1, wherein the space layer is disposed on the second surface, and the protective film covers the space component and the second surface.

5. The display device according to claim 1 further comprising an adhesive layer for adhering the first substrate and the second substrate, disposed in the non-visible region and surrounding the visible region.

6. The display device according to claim 5, wherein at least one of the barrier walls surrounds the adhesive layer.

7. The display device according to claim 5, wherein at least one of the barrier walls surrounds the visible region, and the adhesive layer surrounds at least one barrier wall.

8. The display device according to claim 5, wherein the adhesive layer covers the barrier wall.

9. The display device according to claim 5, wherein the display device comprises a plurality of barrier walls, and the adhesive layer is located between the barrier walls.

10. A display apparatus comprising:
    a display device including:
        a first substrate having a first surface;
        a second substrate comprising a visible region and a non-visible region, and having a second surface opposite to the first surface;
        a space layer including a plurality of spacers and at least one space component, wherein the spacers are located on the visible region, and the space component is located in the non-visible region; and
        a protective film having water vapor barrier property, covering the space component in which the spacer located inside of the space component, and the protective film covering the whole spacer, and contacting with the first surface and the second surface;
        wherein the space component and the protective film form a barrier wall; and
    a printed circuit board assembly connecting to the display device;
    an assembly case, wherein the printed circuit board assembly and the display device are disposed in the assembly case.

11. The display apparatus according to claim 10, wherein the protective film is an inorganic material film.

12. The display apparatus according to claim 10, wherein the space component is disposed on the first surface, and the protective film covers the space component and the first surface.

13. The display apparatus according to claim 10, wherein the space layer is disposed on the second surface, and the protective film covers the space component and the second surface.

14. The display apparatus according to claim 10 further comprising an adhesive layer for adhering the first substrate and the second substrate, disposed in the non-visible region and surrounding the visible region.

15. The display apparatus according to claim 14, wherein at least one of the barrier walls surrounds the adhesive layer.

16. The display apparatus according to claim 14, wherein at least one of the barrier walls surrounds the visible region, and the adhesive layer surrounds at least one barrier wall.

17. The display apparatus according to claim 14, wherein the adhesive layer disposed between the barrier wall and one of the first surface and the second surface.

18. The display apparatus according to claim 14, wherein the display device comprises a plurality of barrier walls, and the adhesive layer is located between the barrier walls.

* * * * *